(12) United States Patent
McCusker (10) Patent No.: US 8,249,806 B1
(45) Date of Patent: Aug. 21, 2012

(54) SYSTEM, MODULE, AND METHOD FOR VARYING THE INTENSITY OF A VISUAL AID DEPICTED ON AN AIRCRAFT DISPLAY UNIT

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 614 days.

(21) Appl. No.: 12/462,969

(22) Filed: Aug. 12, 2009

(51) Int. Cl.
*G08G 5/02* (2006.01)
*G08G 5/06* (2006.01)
(52) U.S. Cl. .................. 701/457; 340/972; 340/980
(58) Field of Classification Search ............. 340/972
See application file for complete search history.

(56) References Cited

U.S. PATENT DOCUMENTS

| | | | | | |
|---|---|---|---|---|---|
| 2,127,954 | A | * | 8/1938 | Dunmore | 342/410 |
| 4,727,364 | A | * | 2/1988 | Vorst | 345/20 |
| 5,153,836 | A | * | 10/1992 | Fraughton et al. | 701/301 |
| 5,394,340 | A | * | 2/1995 | Inkpen et al. | 702/33 |
| 6,157,876 | A | * | 12/2000 | Tarleton et al. | 701/16 |
| 7,656,313 | B2 | * | 2/2010 | Victor et al. | 340/995.26 |
| 2007/0188350 | A1 | * | 8/2007 | He et al. | 340/979 |
| 2010/0156673 | A1 | * | 6/2010 | Grothe | 340/961 |
| 2010/0250030 | A1 | * | 9/2010 | Nichols et al. | 701/7 |
| 2010/0271239 | A1 | * | 10/2010 | Kolcarek et al. | 340/971 |

OTHER PUBLICATIONS

U.S. Appl. No. 11/820,950, filed Jun. 21, 2007, Krenz et al.
U.S. Appl. No. 12/069,234, filed Feb. 8, 2008, Wichgers et al.
U.S. Appl. No. 12/069,319, filed Feb. 8, 2008, Wichgers.
U.S. Appl. No. 12/217,458, filed Jul. 3, 2008, Chiew et al.
"User Requirements for Aerodrome Mapping Information"; Aug. 3, 2005; Title page, Copy Information page, Forward page, Executive Summary pages, and p. A-17; RTCA, Inc.; Washington D.C.

* cited by examiner

*Primary Examiner* — Shelley Chen
(74) *Attorney, Agent, or Firm* — Donna P. Suchy; Daniel M. Barbieri (57) ABSTRACT

A present novel and non-trivial system, module, and method for varying the intensity of a visual aid depicted on an aircraft display unit. Visual aids could represent visible features such as markings on a runway surface. Data representative of visual aids may be provided by a navigation reference data source with errors inherent in the data which may be measured by one or more quality parameters. Also, errors associated with quality parameters are inherent in navigation data which provided positional information. Because of these errors, the depiction of visual aids on an egocentric display unit may appear misaligned with the corresponding visible feature. To compensate for the misalignment, an image generating processor generates visual aid data representative of at least one variable-intensity visual aid, wherein the intensity of each visual aid varies and such variation is based upon at least one quality parameter of the data.

21 Claims, 6 Drawing Sheets

SYSTEM, MODULE, AND METHOD FOR VARYING THE INTENSITY OF A VISUAL AID DEPICTED ON AN AIRCRAFT DISPLAY UNIT

BACKGROUND OF THE INVENTION

1. Field of the Invention

This invention pertains generally to the field of cockpit indicators or display units that provide flight information of a runway environment to the pilot or flight crew of an aircraft, and more particularly to synthetic vision systems (SVS), enhanced vision systems (EVS), or combined SVS-EVS systems.

2. Description of the Related Art

Navigation reference data and navigation data are not exact but contain inherent errors. Navigation reference data may be representative of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs. Navigation reference data is typically stored in a database such as, but not limited to, a taxi navigation database and/or aerodrome mapping database ("AMDB").

A majority of existing AMDBs have been captured and maintained using geographic information systems ("GIS"). As discussed in an industry standard RICA DO-272A published by RTCA, Incorporated and entitled "User Requirements for Aerodrome Mapping Information," GIS technology has evolved from the computer-aided design ("CAD") industry, combining the detailed information available in engineering drawings with a geographic reference system. A GIS is a computer program that combines geographically referenced digital data with spatial and attribute analysis tools. A GIS can include many different types of data including: control networks, vector data, raster grid data, triangulated irregular networks ("TINs"), 3-D surface representations, remotely sensed data, and other digital source data such as geo-referenced drawings or airport layout plans ("ALPs"). Within a GIS, these data sources can be combined, spatially referenced, and analyzed, enabling the user to organize information and answer questions about the spatial relationships between the various dramatic layers as well as the attribute characteristics of the features. In addition to the use of GIS technology, AMDBs have also been developed by digitizing paper charts such as airport obstruction charts, utilizing CAD tools, and in text or tabular files.

DO-272A provides for aerodrome surface mapping requirements for aeronautical uses particularly on-board aircraft. One of the requirements addresses quality of the data contained in an AMDB. Quality could be associated and/or measured with parameters such as, but not limited to, accuracy, resolution, and/or integrity of data stored in any database. Because the data is not exact, the data may not coincide with the surveyed location of visible features such as the airport surfaces and airport visual aids. If this data is presented egocentrically on a display unit such as a HUD unit through which the pilot has an actual view of the scene outside of the aircraft, the visual aid may not align with the actual visible features. That is, the pilot may be presented with an angular misalignment between the actual visible feature and visual aid representative of the visible feature. Where the visual aid is depicted with a constant intensity and/or brightness, the misalignment distracts and/or annoys the pilot, thereby reducing user trust and acceptance of the display unit and the information that it provides. This lack of trust acceptance diminishes the pilot's Situational Awareness, an important safety concern in aviation.

Along with the AMDB, the lack of precision in data arises with data provided by a navigation system. Navigation systems contain inherent errors affecting the quality of the data provided by them. For example, in un-augmented global satellite navigation system, errors could be as much as 100 meters. In an augmented system such as a Satellite-Based Augmentation System ("SBAS"), the quality of data may deliver an improved signal accuracy of approximately 7 meters. In an augmented system such as a Ground-Based Augmentation System ("GBAS"), even better quality of data may deliver an improved signal accuracy of less than 1 meter. Because the data is not exact, the data provided by AMDB that is based on un-exact or inherently erroneous aircraft position data provided by a navigation system may be data not representative of the actual surveyed location of the aircraft. As discussed above, an angular misalignment between actual visible features and corresponding constant-intensity visual aids depicted egocentrically on a display unit could result, thereby affecting the pilot's Situational Awareness.

BRIEF SUMMARY OF THE INVENTION

The embodiments disclosed herein present a non-trivial system, module, and method for varying the intensity of a visual aid depicted on an aircraft display unit. Visual aids could represent visible features such as markings on a runway surface. The use of visual aids may be used to enhance a pilot's Situational Awareness of the ground environment by dimming the intensity of the visual aid where an angular misalignment with the actual corresponding visible feature would appear to be the greatest.

In one embodiment, a system is disclosed for varying the intensity of a visual aid depicted on an aircraft display unit. The system comprises a source of navigation data, a source of navigation reference data, an image generating processor, and an aircraft display system. The image generating processor receives navigation data, receives navigation reference data representative of at least one visible feature, generates visual aid data representative of at least one variable-intensity visual aid, and provides the visual aid data to the aircraft display system for display on at least one aircraft display unit such as a HUD unit. The visual aid data is representative of at least one variable-intensity visual aid, where each visual aid is representative of a visible feature located in the scene outside of the aircraft, and the intensity of each visual aid varies, where such variation is based upon at least one quality parameter of the navigation data, navigation reference data, or both. After being provided with the visual aid data, the display unit each variable-intensity visual aid depicts a fading-in effect of the visual aid in the direction of the horizon. As embodied herein, the intensity of each variable-intensity visual aid may be based upon a full dim position and/or a full bright position, and these may be configurable by a manufacturer or end-user. In additional embodiments, the system could include a source of terrain data and/or a source of weather data, where the data of each could be included in the generation of the visual aid data.

In another embodiment, a module (e.g., a printed circuit board) is disclosed for varying the intensity of a visual aid depicted on an aircraft display unit. The module comprises an input communications interface to facilitate the receiving of data from at least one data source by an image generating processor, the image generating processor, and an output communications interface to facilitate the providing of data to an aircraft display system. The image generating processor receives navigation data, receives navigation reference data representative of at least one visible feature, generates visual aid data representative of at least one variable-intensity visual aid, and provides the visual aid data to the aircraft display system for display on at least one aircraft display unit such as a HUD unit via the external communications interface. The visual aid data is representative of at least one variable-intensity visual aid as discussed above.

In another embodiment, a method is disclosed for varying the intensity of a visual aid depicted on an aircraft display unit. The method comprises receiving navigation data, receiving navigation reference data representative of at least one visible feature, generating visual aid data representative of at least one variable-intensity visual aid, and providing the visual aid data to the aircraft display system for display on at least one aircraft display unit such as a HUD unit via the external communications interface. The visual aid data is representative of at least one variable-intensity visual aid as discussed above.

BRIEF DESCRIPTION OF THE DRAWINGS

The drawings of FIG. 2 depict exemplary illustrations of images on a HUD unit and an HDD unit, respectively.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
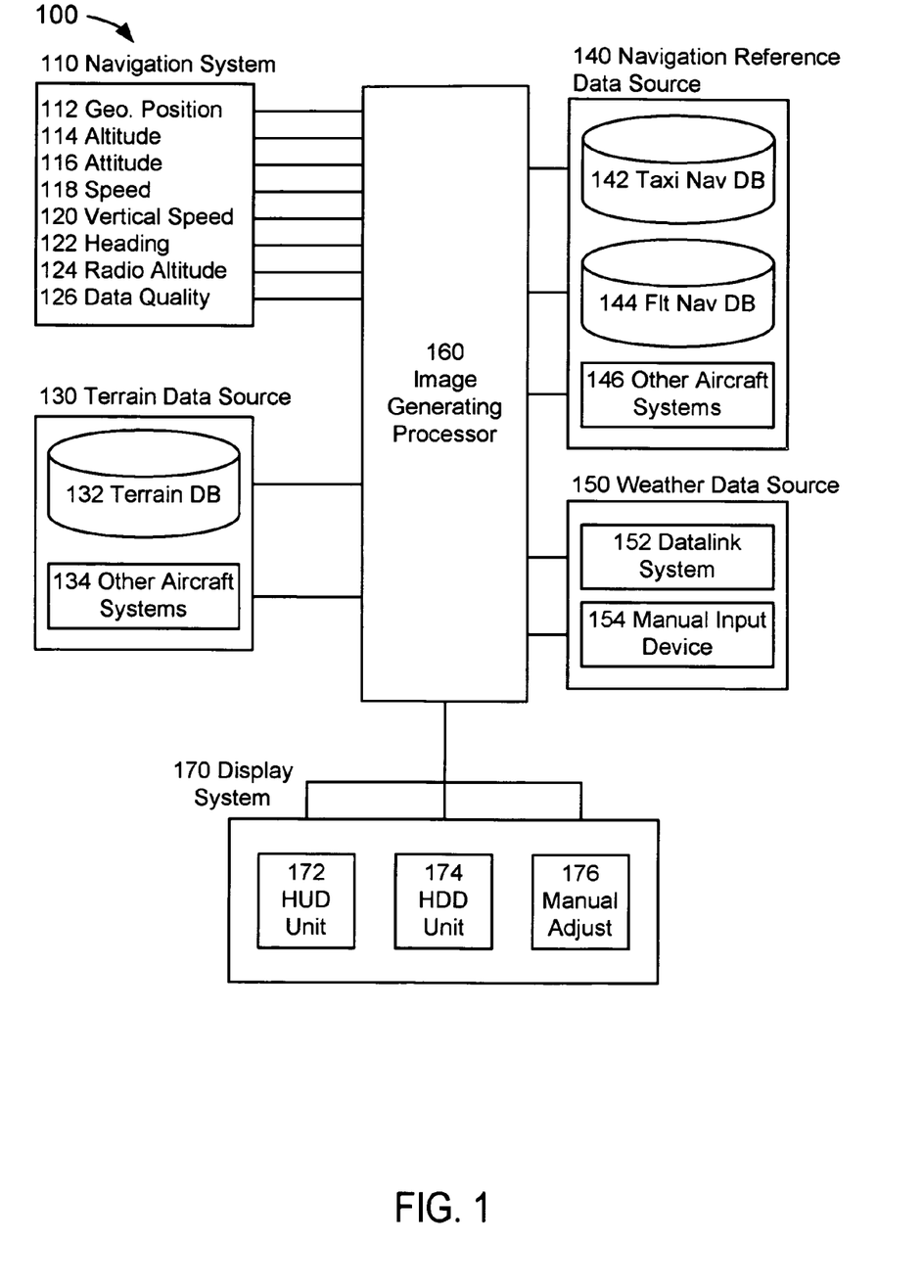
FIG. 1 depicts a block diagram of a variable-intensity visual aid system.

FIG. 1 depicts a block diagram of a variable-intensity visual aid system 100 suitable for implementation of the techniques described herein. The variable-intensity visual aid system 100 of an embodiment of FIG. 1 could include a navigation system 110, a terrain data source 130, a navigation reference data source 140, a weather data source 150, an image generating ("IG") processor 160, and/or a display system 170.

In an embodiment of FIG. 1, a navigation system 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation data including, but not limited to, geographic position 112, altitude 114, attitude 116, speed 118, vertical speed 120, heading 122, radio altitude 124, day/date/time 126 and data quality 128 to an IG processor 160 for subsequent processing as discussed herein. As embodied herein, aircraft position comprises geographic position (e.g., latitude and longitude coordinates) and altitude, and direction may be derived from either geographic position, aircraft position, or both. As embodied herein, aircraft orientation may include pitch, roll, and/or yaw information related to the attitude of the aircraft.

Day/date/time 126 could be data representative of the day, date, or time, or any combination of them, and may be used, for example, for determining whether a runway is available for operation. Navigation data quality 128 may include parameters associated with, but not limited to, accuracy, resolution, integrity, uncertainty, and/or validity for data provided by a navigation system 110. Those skilled in the art understand that quality of navigation data could depend on the system providing the data, e.g., an air/data system, an attitude heading reference system, an inertial guidance system (or inertial reference system), a global navigation satellite system (or satellite navigation system), and a flight management computing system. Furthermore, the quality of navigation data provided by a system could depend on other considerations.

For example, a global navigation satellite system could depend on whether a system is employed to augment satellite signals. A Satellite-Based Augmentation System ("SBAS") such as the wide area augmentation system ("WAAS") employed by the United States Federal Aviation Administration ("FAA") may deliver an increase of quality of data through such parameters as accuracy, availability, and integrity; a WAAS broadcast message may improve signal accuracy from 100 meters to approximately 7 meters. A Ground-Based Augmentation System ("GBAS") such as the local area augmentation system ("LAAS") employed by the FAA may deliver an even better quality of data than a WAAS by providing extremely high parameters of accuracy, availability, and integrity; for example, a LAAS has demonstrated an accuracy of less than 1 meter in both the horizontal and vertical axes.

In an embodiment of FIG. 1, a terrain data source 130 may include, but is not limited to, a terrain database 132, other aircraft systems 134, or any combination thereof. A terrain data source 130 could comprise any source of terrain data, obstacle data, other manmade or natural features, geopolitical boundaries, or any combination thereof. Obstacles may include, but are not limited to, towers, buildings, poles, wires, other manmade structures, and foliage.

A terrain database 132 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 132, taxi navigation database 142, and flight navigation database 144 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in terrain database 132, and a temporary runway closure could be stored in a taxi navigation database 142 and/or a flight navigation database 144. Any database used in the embodiments disclosed herein may be a stand-alone database or a combination of databases. For example, a terrain database 132 may be associated with a terrain awareness and warning system ("TAWS") only. In an alternative embodiment, terrain data could be stored in or combined with an airport database, airspace database, or with a database used by any other aircraft system including, but not limited to, a flight management computing system, or an airspace awareness and warning system ("AAWS"). An example of a TAWS and an AAWS which utilize airport and airspace databases are described is described by Wichgers et al and Wichgers in U.S. patent application Ser. Nos. 12/069,234 and 12/069,319, respectively.

Although other aircraft systems 134 could employ terrain databases 132, such systems could also be a source of terrain data provided to a processor 160. For example, a synthetic vision system ("SVS") may employ a terrain database to generate terrain image data. Here, the terrain database that is part of an SVS could be the source of terrain data in a variable-intensity visual aid system 100. Alternatively, the SVS could provide an IG processor 160 with terrain data in the form of terrain image data. In another alternative, an Enhanced Vision System ("EVS") could provide terrain data in the form of terrain image data. In another alternative, a combination of an SVS and EVS ("combined SVS-EVS") could provide terrain data in the form of terrain image data. Other examples of other aircraft systems 134 which could comprise sources of terrain data include, but are not limited to, a TAWS and an AAWS. As embodied herein, a terrain database 132 and other aircraft systems 134 could provide terrain data to an IG processor 160 for subsequent processing as discussed herein.

In an embodiment of FIG. 1, a navigation reference data source 140 could comprise any source of runway data. A navigation reference data source 140 may include, but is not limited to, a taxi navigation database 142, a flight navigation database 144, and other aircraft systems 146.

A taxi navigation database 142, such as one described by Krenz et al in U.S. patent application Ser. No. 11/820,950, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

A taxi navigation database 142 could comprise an aerodrome mapping database ("AMDB") as described in the following document published by RTCA, Incorporated: RTCA DO-272A entitled "User Requirements for Aerodrome Mapping Information." DO-272A provides for aerodrome surface mapping requirements for aeronautical uses particularly on-board aircraft. One of the requirements addresses quality of the data contained in an AMDB. Quality could be associated and/or measured with parameters such as, but not limited to, accuracy, resolution, and/or integrity of data stored in any database. As embodied herein, data representative of one or more of these parameters of data quality may be stored in any databases discussed herein and is not limited to an AMDB. It should be noted that, although some of the discussion herein may be drawn to quality standards discussed in DO-272A, the embodiments disclosed herein are not limited to the classifications defined therein or the contents contained therein. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions with affect the content and/or structure of an AMDB.

A flight navigation database 144 may contain records which provide runway data. A flight navigation database 144 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Such flight navigation database 144 could be provided by an aircraft system such as, but not limited to, an FMS, a system known to those skilled in the art. As disclosed by Chiew et al in U.S. patent application Ser. No. 12/217,458 entitled "System, Apparatus, and Method for Generating Runway Visual Aids on an Aircraft Display Unit," runway data provided by a flight navigation database 144 may be used to derive visual aid data.

Other aircraft systems 146 could comprise a source of runway data. For example, both TAWS and AAWS may utilize airport data which may contain, in part, runway data. As embodied herein, a navigation reference data source 140 could provide runway data to an IG processor 160 for subsequent processing as discussed herein.

In an embodiment of FIG. 1, a weather data source 150 could comprise any source of weather data including, but not limited to, a datalink system 152 and/or manual input device 154. A datalink system 152 includes those systems that receive data from sources external to the aircraft including, but not limited to, ground stations and satellites. In an embodiment of FIG. 1, data representative of weather information could be transmitted to the pilot or flight crew of an aircraft via a datalink system 152 which could provide weather information data including data representative of visibility information to an IG processor 160 for subsequent processing as discussed herein. Weather data transmitted through a datalink system could originate from or be provided by a plurality of weather data sources including, but not limited to, XM Satellite Radio, Inc. and Universal Weather and Aviation, Inc. Weather data that may be broadcast could include data contained in a variety of weather products such as, but not limited to, Aviation Routine Weather Report ("METAR"), Significant Meteorological Information ("SIGMET"), Airmen's Meteorological Information ("AIRMET"), Next-Generation Radar ("NEXRAD"), surface analysis weather maps, surface pressure, surface wind speed and direction, winds aloft, wind shear detection, echo tops, and freezing levels.

Manual input device 154 could allow the pilot or flight crew to facilitate the entry of data manually instead of automatically. Such devices could include, but are not limited to, a tactile device such as a keyboard and/or speech recognition systems. The use of a manual input device 154 could enable the pilot or flight crew to input weather data including reported viability data manually via such device after listening to a weather report broadcast over a communications radio.

An IG processor 160 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An IG processor 160 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, an IG processor 160 could be a processor(s) used by or in conjunction with any other system of the aircraft including, but not limited to, a processor(s) associated with a navigation system 110, a terrain data source 130, a navigation reference data source 140, a weather source 150, or a display system 170, or any combination thereof.

An IG processor 160 may receive input data from various systems including, but not limited to, navigation system 110, terrain data source 130, navigation reference data source 140, and/or a weather data source 150. An IG processor 160 may be electronically coupled to these facilitate the receipt of input data; as embodied herein, operatively coupled may be considered as interchangeable with electronically coupled. An IG processor 160 may provide output data to various systems including, but not limited to, a display system 170. An IG processor 160 may be electronically coupled to this system to facilitate the providing of output data. It is not necessary that a direct connection be made; instead, such receipt of input data and the providing of output data could be provided through a data bus or through a wireless network. As known to those skilled in the art, a processor and/or electronic coupling may be made part of a module such as, but not limited to, a printed circuit board, and that such module may be installed on an aircraft as part of an aircraft system and/or could be housed in an aviation component known as a line replaceable unit that is installed in an aircraft as part of an aircraft system.

In an embodiment of FIG. 1, display system 170 could comprise one or more tactical display units that provide symbology of tactical flight information to a pilot or flight crew. As embodied herein, display system 170 may include a vision system (not shown) which generates an image data set which represents the image displayed on a display unit. Vision systems include, but are not limited to, SVS, EVS, combined SVS-EVS, or combination thereof.

A tactical display unit could be any unit which presents tactical information to the crew relative to the instant or immediate control of the aircraft, whether the aircraft is in flight or on the ground. A tactical display unit could be a Head-Up Display ("HUD") unit 172 and/or a Head-Down Display ("HDD") unit 174. A HUD unit 172 is mounted in front of the pilot at windshield level and is directly in the pilot's field of vision. The HUD unit 172 is advantageous because the display is transparent allowing the pilot to keep his or her eyes "outside the cockpit" while the display unit provides tactical flight information to the pilot. An HDD unit 174 is typically a unit mounted to an aircraft's flight instrument panel located in front of a pilot and below the windshield and the pilot's field of vision.

A tactical display unit could display the same information found on a primary flight display ("PFD"), such as "basic T" information (i.e., airspeed, attitude, altitude, and heading). Although it may provide the same information as that of a PFD, a tactical display unit 164 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 164 is designed to provide flexible configurations which may be tailored to the desired configuration specified by a buyer or user of the aircraft.

Figure 2A:
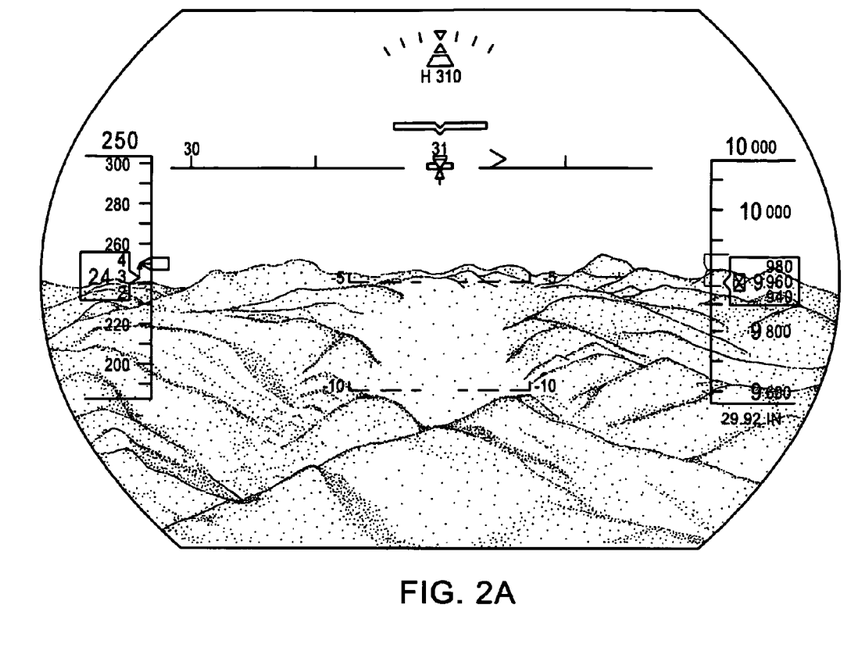

FIG. 2A provides an exemplary depiction of a HUD unit 172 for presenting tactical information to the pilot or flight crew against a scene of terrain outside of an aircraft; a HUD unit could be employed as a display unit in a synthetic vision system, an enhanced vision system, or combination of both. It should be noted that the tactical information depicted on the HUD unit has been made minimal for the sake of presentation and is not indicative of the plurality of indications or information with which it may be configured.

Figure 2B:
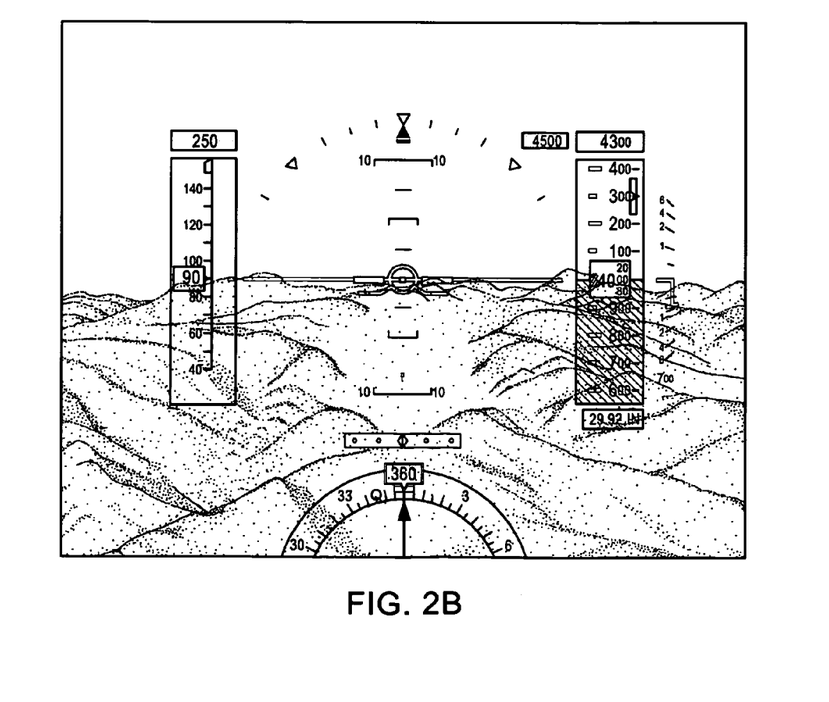

FIG. 2B provides an exemplary depiction of an HDD unit 174 for presenting tactical information to the pilot or flight crew against the background of a two-dimensional or three-dimensional image of terrain and sky; an HDD unit could be employed as a display unit in an SVS, an EVS, or a combined SVS-EVS. It should be noted that the tactical information depicted on the HDD unit and has been made minimal for the sake of presentation and is not indicative of the plurality of indications or information with which it may be configured. Because the indications or information shown in FIGS. 2A and 2B are well-known to those skilled in the art, a discussion of the specific tactical information depicted on the HUD unit and HDD unit, respectively, is not provided herein.

Returning to FIG. 1, a manual adjustment device could be any device which allows the pilot or flight crew to facilitate the adjustment of the position of a full dim of a visual aid, the position of a full bright, or both, from a different position(s) determined automatically by an IG processor 160 as discussed in detail below. Such devices could include, but are not limited to, a tactile device such as switch and/or speech recognition systems.

The advantages and benefits of the embodiments discussed herein may be illustrated by showing examples of depictions of visual aids representative of visible features on a tactical unit display that are known to those skilled in the art and the novel. It should be noted that in the depictions of HUD units that follow, the tactical information that was presented in FIG. 2A has been omitted for the sake of presentation and clarity and is not indicative of the plurality of indications or information with which it may be configured with the embodiments disclosed herein.

Figure 3A:
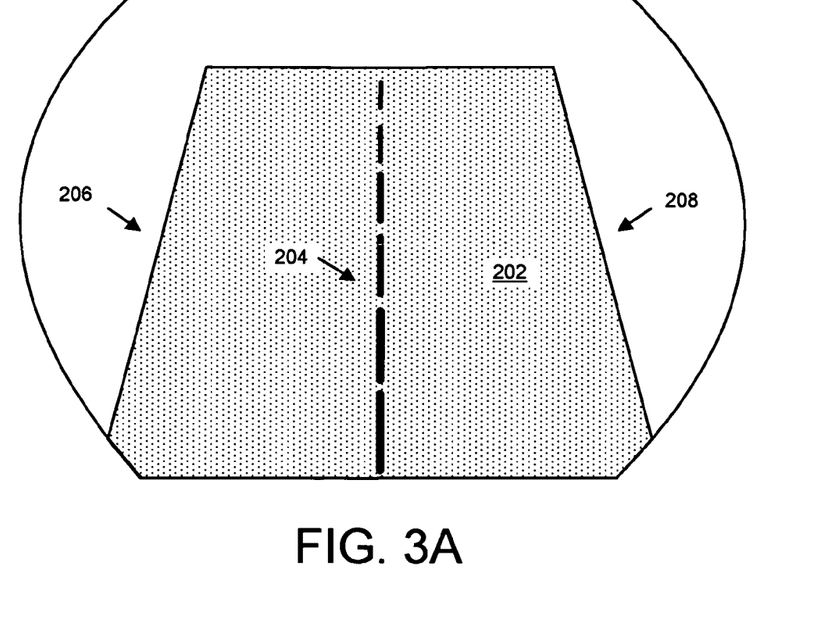
FIG. 3A depicts an exemplary illustration of visible features of the scene outside of the aircraft observed through a HUD unit.

FIG. 3A provides an illustrative example of a HUD unit mounted in front of the pilot at windshield level and is directly in the pilot's field of vision. As illustrated, the scene outside of the aircraft viewed by a pilot in an aircraft sitting on a runway include visible features of a surface of a runway 202 (as illustrated with a dotted pattern), runway centerline marking 204, and runway edge lines markings 206 and 208. For the purposes of illustration and discussion herein and not for the purposes of limitation, runway edge line markings 206 and 208 will be assumed to designate runway shoulders. Although an actual runway may provide more markings on the surface than runway centerline markings and runway edge line markings, the discussion herein will be drawn to these two markings for the purpose of illustration only. The embodiments disclosed herein are not limited to runway centerline and edge lines markings. Furthermore, it should be noted that the illustrations of a runway surface and markings representing the scene in front of the aircraft through the transparent display of a HUD units shown in the drawings of FIGS. 3 through 5, inclusive, have been intentionally exaggerated. For example, dimensions of the runway and/or markings are not drawn to scale, and there is an appreciable "downward-looking" view of runway 202 for an aircraft sitting on a runway.

Figure 3B:
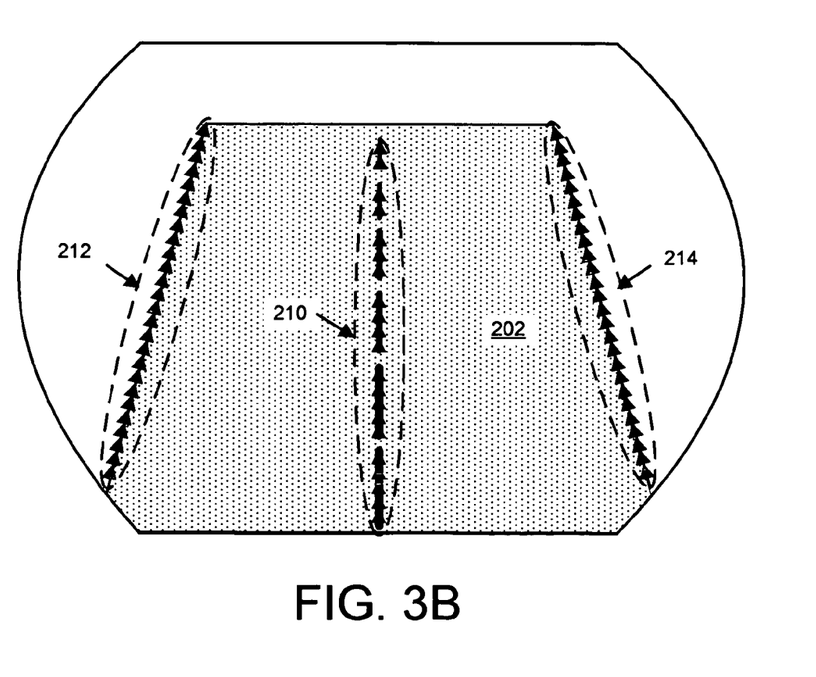
FIG. 3B depicts an exemplary illustration of visual aids depicted on a HUD unit that are aligned with the visible features of the scene outside of the aircraft.

FIG. 3B provides an illustrative example of a prior art HUD unit depicting visual aids representative of visible features in the scene outside of the aircraft. A visual aid representative of a runway centerline marking 210 is shown as groupings of triangles, and visual aids representative of runway edge lines markings 212 and 214 are shown as lines of triangles. As shown, the visual aids align with the visible features. That is, a visual aid of a runway centerline marking 210 aligns with the visible feature of the centerline runway marking actually present on runway 202, and the visual aids of runway edge lines markings 212 and 214 align with the visual features of the actual runway edge lines markings actually present on runway 202 in FIG. 3B. To the pilot, the visual aids appear to coincide or overlay of the visible features because there is no misalignment.

Figure 4A:
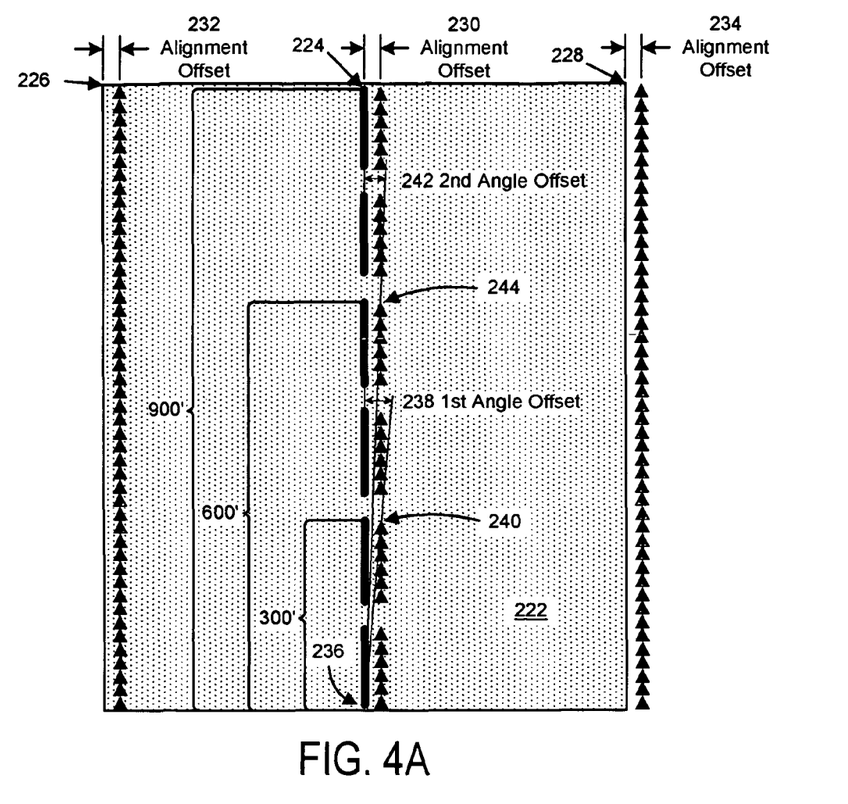
FIG. 4A depicts an exemplary illustration of a plan view illustrating data representative of visual aids which do not align with the actual visible features represented by the visual aids.
Figure 4B:
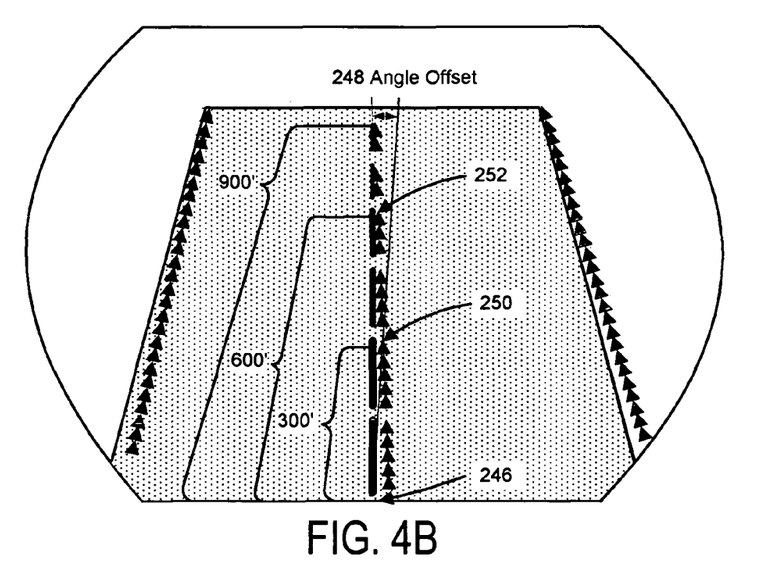
FIG. 4B depicts an exemplary illustration of visual aids depicted on a HUD unit that are not aligned with the visible features of the scene outside of the aircraft.

The drawings of FIG. 4 provide illustrations of how quality of data provided to a processor for generating data representative of the visual aids may affect that alignment in the presentation of such visual aids. FIG. 4A depicts a plan view of a runway 222, runway centerline marking 224, and runway edge line markings 226 and 228. To the right of the runway centerline marking 224 are groupings of triangles corresponding to the visual aid data representative of the runway centerline marking, and to the right of the runway edge lines markings 226 and 228 are lines of triangles corresponding to the visual aid data representative of runway edge lines markings. As observed, the groupings and lines of triangles do not coincide with the runway centerline 224 and runways edge lines markings 226 and 228, respectively; that is, there is no alignment between them. Instead, there is an offset 230 between the runway centerline marking 224 and its respective visual aid; likewise, there are offsets 232 and 234 between the runway edge line markings 226 and 228 and their respective visual aids.

These misalignments and/or presence of offsets may be attributed to quality of the data. As stated above, quality could be associated with parameters such as accuracy, resolution, and/or integrity of data. Accuracy may be classified as fine, medium, and/or course where mapping data accuracy could be categorized as fine if it meets a 95% confidence level and medium or coarse if it meets a 90% confidence level. If data is categorized as fine, runway centerline markings and runway edge line markings could have an accuracy of 0.5 meter and a resolution of 0.01 meter; if categorized as medium, these markings could have an accuracy of 5 meters and a resolution of 0.1 meter. Given these values associated with quality, offsets 230, 232, and 234 could be as much as 0.51 m in the fine category and 5.1 m in the medium category.

The misalignments and/or presence of offsets may also be measured angularity from a fixed position. As illustrated in FIG. 4A, two angle offsets measured from position 236 located on the actual centerline marking are shown. First angle offset 238 measures the angle between centerline 224 and the alignment offset 230 at position 240 that is a distance 300 feet from position 236. Second angle offset 242 measures the angle between centerline 224 and the alignment offset 230 at the position 244 that is a distance 600 feet from position 236. The values of the first angle offset 238 and the second angle offset 242 could depend on the category of the data. If the category of data is fine and the quality of data produces an offset of 0.51 m, then the values of the first angle offset 238 and second angle offset 242 would be approximately 0.32° and 0.16°, respectively. If the category of data is medium and the quality of data produces an offset of 5.1 m, then the values of the first angle offset 238 in the second angle offset 242 would be approximately 3.2° and 1.6°, respectively. Similarly, angle offsets at positions 900 feet and 1200 feet from position 236 would be approximately 0.11° and 0.08°, respectively, for fine category data and 1.07° and 0.80°, respectively, for medium category data. Through observation, it is noted that angle offsets do not stay the same but vary (i.e., decrease) the further away from position 236 the angle is measured.

FIG. 4B depicts the misalignments and/or offsets of the plan view of FIG. 4A to an egocentric view of a pilot located near position 246 (which could correspond to position 236 is FIG. 4A). FIG. 4B provides an illustrative example of a prior art HUD unit depicting misaligned and/or offset visual aids for an aircraft positioned on the runway centerline. When viewed by a pilot, the visual aids do not coincide or overlay of the visible features represented because there of the misalignment. A visual aid comprising a grouping of triangles is misaligned from the visible feature of a runway centerline marking actually present in the scene outside of the aircraft, and visual aids comprising lines of triangles are misaligned from the visible features of runway edge lines markings actually present in the scene. As noted in FIG. 4A, the amount of misalignment and/or offset may vary with the distance from the observer. From the pilot's view of the scene as depicted in FIG. 4B, there appears to be a gradual convergence between the visual aids and visible features occurring in the direction of the horizon. This gradual convergence may be attributed to the egocentric, three-dimensional perspective view of the pilot, where the greatest amount of offset may occur with a part of the visible feature that is the nearest. As observed in FIG. 4B, the offset angle 248 at point 250 nearer to the pilot at a distance of 300 feet from position 246 is greater than the offset angle (not shown) at point 252 further away from the pilot at a distance of 600 feet from position 246; that is; the angle of offset is seen as decreasing in the direction of the horizon. Likewise, the misalignments and/or offsets between the visual aids representative of runway edge lines and the visible features of the runway edge lines of FIG. 4B decrease in the direction of the horizon; however, these are less noticeable to the pilot when located on or near the center of the runway.

The drawings of FIG. 4 provide illustrations of visual aids which may be presented on a display unit with a constant intensity and/or brightness level. Unfortunately, a presentation of a constant-intensity visual aid may obscure real-world physical features and tend to highlight misalignments between the visual aid(s) presented on a display unit and the physical feature(s) found in the scene outside of the aircraft. Such misalignments could distract and/or annoy a pilot that, in turn, could result with the pilot placing less reliance, trust, and/or acceptance of the display system and the information presented on a display unit. This could hinder the pilot's overall situational awareness. The advantages and benefits of the embodiments discussed herein may be illustrated in the drawings of FIG. 5 by showing examples of how situational awareness of a runway environment could be enhanced by presenting a visual aid comprised of varying intensities based upon one or more quality of data parameters.

Figure 5A:
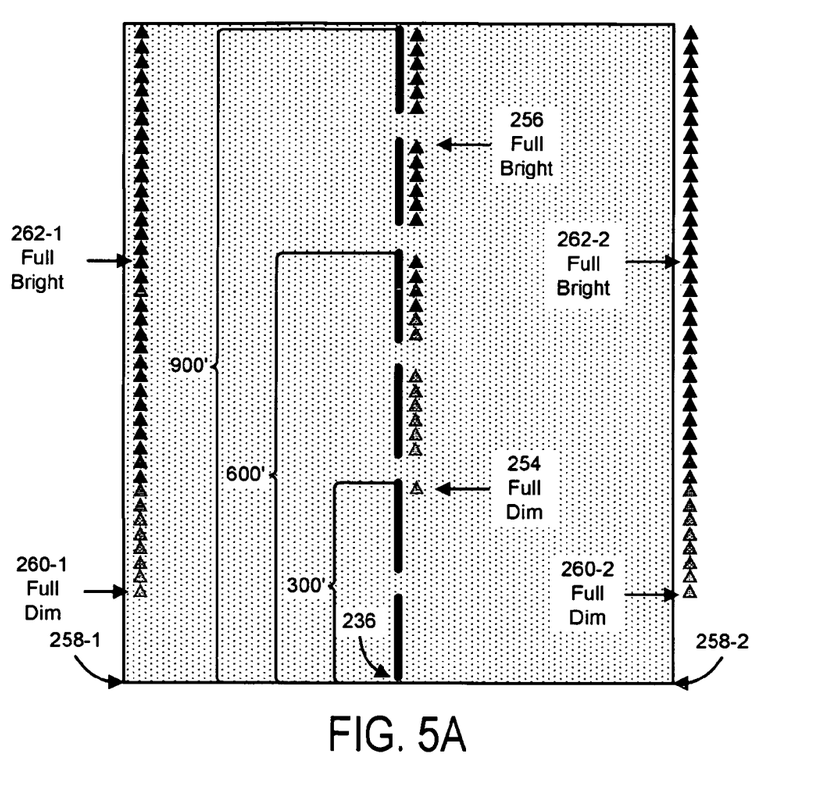
FIG. 5A depicts an exemplary illustration of a plan view illustrating data representative of variable-intensity visual aids which do not align with the actual visible features represented by the visual aids.

FIG. 5A depicts a plan view of a runway, runway centerline marking, and runway edge line markings of FIG. 4A. Additionally, visual aid data representative of the runway centerline marking and runway edge lines markings previously shown in FIG. 4A are depicted, but the intensities of each visual aid vary. As illustrated, visual aid data representative of the runway centerline marking begins at a distance of 300 feet from position 236, where the visual aid is presented at full dim 254. As the distance from position 236 increases, the intensity increases gradually until reaching a point where the intensity becomes full bright 256 approximately 750 feet from position 236. Similarly, visual aid data representative of the runway edge lines markings begin at a distance of approximately 150 feet from positions 258-1 and 258-2, where the visual aids are presented at full dim 260-1 and 260-2. As the distances from positions 258-1 and 258-2 increase, the intensities increase gradually until reaching a point where the intensity becomes full bright 262-1 and 262-2 approximately 600 feet from positions 258-1 and 258-2.

Figure 5B:
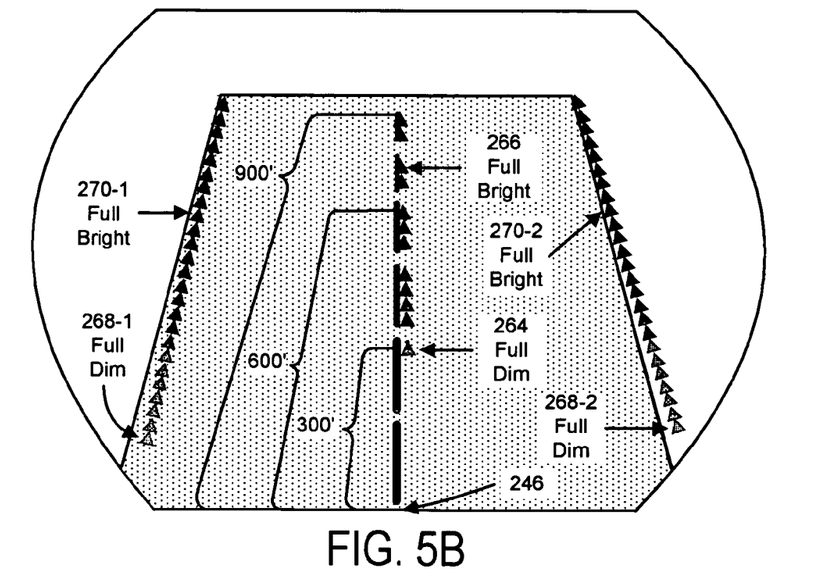
FIG. 5B depicts an exemplary illustration of variable-intensity visual aids depicted on a HUD unit that are not aligned with the visible features of the scene outside of the aircraft.

FIG. 5B depicts the plan view of FIG. 5A as an egocentric view of a pilot located near position 246 (which could correspond to position 236 is FIG. 5A). As illustrated, the runway centerline marking visual aid begins at a full dim 264 at a distance of 600 feet from position 246 and increases in intensity until reaching full bright 266 in the direction of the horizon at an approximate position of 750 feet from position 246. Similarly, the runway edge lines visual aids begin at a full dim 268-1 and 268-2 and increase in intensity until reaching full bright 270-1 and 270-2 in the direction of the horizon. As observed, the gradually increasing intensities from full dim to full bright present to the pilot a "fading-in" effect as the distance from position 246 increases; alternatively, the gradually decreasing intensities from full bright to full dim present to the pilot a "fading-out" effect as the distance from position 246 decreases. Moreover, it may be observed that, as the runway centerline marking converges with its corresponding visual aid and as the runway edge lines markings converge with their corresponding visual aids in the direction of the horizon, the intensities of each increase with the respective convergences. By varying the intensities of each visual aid, the misalignments and/or offsets prevalently highlighted at positions closest to the viewer as a result of a constant-intensity visual aid are diminished.

It should be noted that the distances of 300 feet, 600 feet, and 900 feet depicted in the drawings of FIG. 5 have been selected at random for the purposes of illustration only and not for the purpose for limiting the embodiments disclosed herein. As embodied herein, the distances to the full dim and full bright positions of each visual aid may be configured by a manufacturer or end-user. For example, quality of data may serve as a configuration basis. A manufacturer or end-user may configure such distances based on the category of data stored in a database. On the one hand, if data categorized as fine may be used, a manufacturer or end-user could select 300 feet from the current position of the aircraft as a full dim distance for a runway centerline visual aid and 600 feet as a full bright distance; on the other hand, if data categorized as medium may be used, a manufacturer or end-user could select 700 feet from the current position of the aircraft as a full dim distance for a runway centerline visual aid and 1,000 feet has a full bright distance.

In another embodiment, the quality of data may be associated with a system providing navigation data. For example, the quality of data provided by a GBAS used to augment satellite signals global navigation satellite system is higher than the quality of data provided by a SBAS as discussed above. In another embodiment, the quality of data may be associated with a category type of instrument approach procedure such as, but not limited to, Category I, Category II, Category IIIa, Category IIIb, and Category IIIc, where each category allows the pilot to operate an instrument approach procedure in different visibility conditions. For example, a Runway Visual Range ("RVR") of 1,200 feet may be required to operate a Category II procedure and 700 feet for a Category IIIa procedure. The distances to full dim and full bright positions could depend on the category for which the aircraft is certified. If certified for Category II operations, full dim and full bright could correspond to the 700 feet and 1,000 feet distances, respectively, stated above which could allow for a fade-in to full bright just prior to the RVR distance of 1,200 feet for the category; If certified for Category IIIa operations, full dim and full bright could correspond to the 300 feet and 600 feet distances, respectively, stated above which could allow for a fade-in to full bright just prior to the RVR distance of 700 feet for the category.

In another embodiment, a manufacturer may use a combination of quality of data from more than one data source. For example, quality of data associated with an accuracy parameter of a navigation source could be averaged with an accuracy parameter associated with a navigation reference data source; alternatively, a manufacturer or end-user may select the parameter providing the higher quality of data between a plurality of quality of data sources.

In another embodiment, a manufacturer or end-user could configure different distances for different visual aids. For example, if fine-category data may be used, a distance of zero feet from the current position of the aircraft could be selected as a full dim distance for runway edge lines visual aid and a distance of 450 feet as a full bright distance; if medium-category data may be used, a distance of 300 feet from the current position of the aircraft could be selected as a full dim distance for runway edge lines visual aid and a distance of 700 feet as a full bright distance. As the preceding examples illustrate, a manufacturer or end-user has the ability to configure full dim and full bright distances, the values of which may vary from one manufacturer to another or one end-user to another; the embodiments disclosed herein provide a manufacturer or end-user with considerable flexibility with regards to configuration.

The distances to the full dim and full bright positions of each visual aid may be configured to include data represented by actual weather information provided by a weather data source 150 by a manufacturer or end-user. In one embodiment, such positions may be determined using reported weather conditions to adjust full dim position, full bright position, or both. In another embodiment, a manufacturer or end-user may choose to not include data representative of quality of data and choose full dim and full bright positions using data representative of visibility conditions only. As embodied herein, visibility conditions data may be received, for example, automatically through a datalink system 152 and/or manually through a manual input device 154.

If the visibility is greater than minima criteria established for instrument approach and departure procedures, then this information may be used to adjust full dim and full bright positions in the direction of the horizon or away from the pilot. In fact, if visibility is reported beyond the length of the runway, then manufacturer or end-user may choose to not display or present the visual aids where actual runway visible features are in sight. If the visibility is less than minima criteria established for instrument approach and departure procedures, then this information may be used to adjust full dim and full bright positions in the direction away from the horizon or towards of the pilot.

Figure 6:
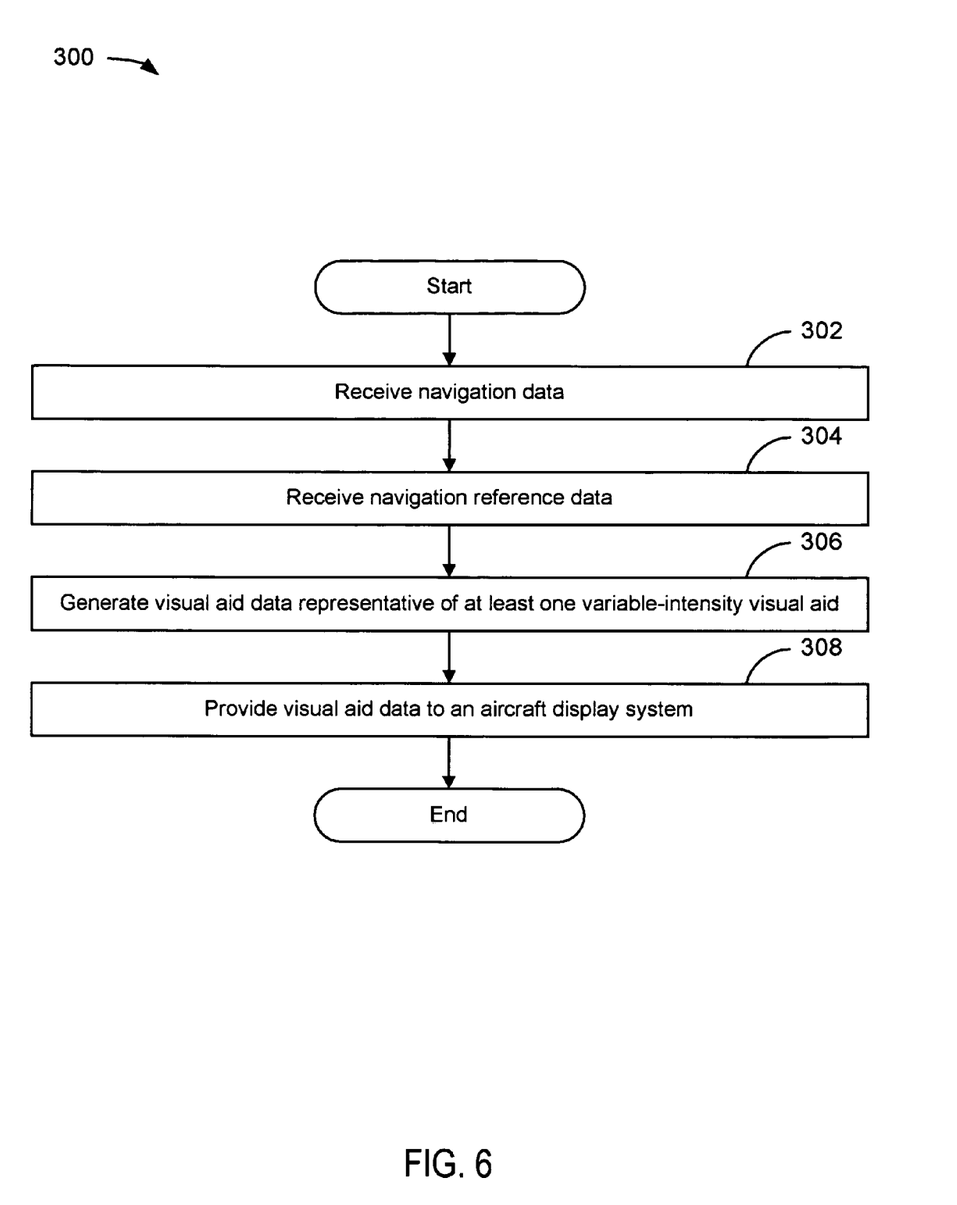
FIG. 6 provides a flowchart illustrating a method for varying the display of at least one visual aid depicted on an aircraft display unit.

FIG. 6 depicts a flowchart 300 of an example of a method for varying the intensity of at least one visual aid in a variable-intensity visual aid system 100. The flowchart begins with module 302 with the receiving of navigation data by an IG processor 160 including data representative of the aircraft position and attitude in flight. The navigation data could be provided by a navigation system 110 to an IG processor 160, and position could comprise of geographic position (e.g., latitude and longitude coordinates) and altitude. As embodied herein, the receiving of any data by an IG processor or the providing of data to an IG processor may comprise an operation in which an IG processor performs a retrieval operation of such data; that is, the two actions are treated synonymously. As embodied herein, a change in aircraft position could be used to determine the direction of a scene outside the aircraft The flowchart continues with module 304 with the receiving of visible feature data. Visible feature data located in the scene may be received from a navigation reference data source 140 based upon and/or corresponding to aircraft position. In one embodiment, surface data could be provided by a taxi navigation database 142. In another embodiment, surface data could be provided by a flight navigation database 144. In another embodiment, surface data could be provided by other aircraft systems or components 146 thereof including, but not limited to, a TAWS and/or an AAWS.

The flowchart continues with module 306 with generating of visual aid data representative of at least one visual aid having variable intensities by an image generating processor 160. Each variable-intensity visual aid may be representative of a visible feature located in the scene outside the aircraft and based upon at least one quality parameter of the navigation data received in module 302, navigation reference data received in module 304, or a combination of both. In one embodiment, quality parameters corresponding to navigation data provided by a navigation system 110 could include, but are not limited to, accuracy, availability, and/or integrity as discussed above. In another embodiment, a quality parameters corresponding to visible feature provided by a navigation reference data source 140 could include, but are not limited to, accuracy, resolution, and/or integrity as discussed above.

As embodied herein, one or more quality parameters may provide the basis for determining a position where the brightness or intensity a visual aid begins at full dim and increases in the direction of the horizon. Additionally, one or more quality parameters may provide the basis for determining a position where a visual aid with variable intensity reaches full bright. The intensity or brightness of each visual aid may vary to produce a fading-in effect in a direction towards the horizon or away from the pilot and/or fading-out effect in the direction away from the horizon or towards the pilot. The selection and/or generating of one or more visual aids may depend on the configuration, where such configuration may be determined by a manufacturer and/or end-user. Visual aid data may be data representative of one or more visual aids that could be displayed on a display unit such as a HUD unit, an HDD unit, or both.

In one embodiment, visual aid data may comprise data representative of visible features located in the scene outside of the aircraft and contained in navigation reference data and generated by an IG processor 160 using runway data. As discussed above, visual aids may represent one or more visible features including, but not limited to, a runway centerline marking and/or runway edge lines markings. In another embodiment, data representative of terrain and/or obstacles may be received from a terrain data source by an IG processor 160, wherein the generation of visual aid data could include terrain data for a depiction of one or more visual aids against the backdrop of a three-dimensional perspective of the scene outside the aircraft on an aircraft display unit. In another embodiment, data representative of weather conditions may be received from a weather data source 150, wherein the generation of the visual aid data may include weather data in the adjustment of the variable intensity of one or more visual aids including, but not limited to, a full dim position, the full bright position, or both.

The flowchart continues with module 308 with providing of visual aid data representative to an aircraft display system 170 by an IG processor 160 for display on one or more display units such as a HUD unit, 172, a HDD unit 174, or both. When presented to the pilot or flight crew, the intensity of each variable-intensity visual aid presents to the viewer a fading-in effect of the visual aid in the direction towards the horizon and/or a fading-out of the visual aid in the direction towards the viewer. In an embodiment where terrain and/or obstacle data is received, the fading-in and/or fading-out effect may be presented against the backdrop of a three-dimensional perspective of the scene outside the aircraft. In an embodiment where weather data is received, the fading-in and/or fading-out effect may be adjusted corresponding to the weather, where such adjustment could include a result in which such visual aid(s) do not get presented on the aircraft display unit. In an embodiment which includes a manual adjustment device 176, a full dim position, full bright position, or both may be adjusted from the position(s) determined automatically by an IG processor 160. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for varying the display of at least one visual aid depicted on an aircraft display unit, said system comprising:
    a data source for providing navigation data;
    a data source for providing navigation reference data;
    an image generating processor, wherein such processor
        receives navigation data representative of aircraft position,
        receives navigation reference data representative of at least one visible feature which corresponds to the aircraft position,
        generates visual aid data representative of at least one variable-intensity visual aid, where
            each visual aid is representative of a visible feature located in the scene outside of the aircraft, and
            the intensity of each visual aid varies, where such variation is based upon at least one quality parameter of the navigation data, navigation reference data, or both, and
        provides the visual aid data to an aircraft display system; and
    the aircraft display system, whereby the varying intensity of each visual aid depicts a fading-in effect of the visual aid in the direction of the horizon on at least one display unit.

2. The system of claim 1, wherein the data source for providing navigation reference data comprises a taxi navigation database, a flight navigation database, other aircraft systems, or any combination of these.

3. The system of claim 2, wherein the taxi navigation database is an aerodrome mapping database.

4. The system of claim 1, wherein the intensity of each variable-intensity visual aid is based upon a full dim position, a full bright position, or both.

5. The system of claim 4, wherein the full dim position, a full bright position, or both for each variable-intensity visual aid are configurable.

6. The system of claim 1, further comprising:
    a data source for providing terrain data; and
    the image generating processor
        receives the terrain data corresponding to the aircraft position, such that the terrain data is included in the generating of visual aid data, whereby each visual aid is presented against the backdrop of a three-dimensional perspective of the scene outside the aircraft.

7. The system of claim 6, wherein the data source for providing terrain data comprises a terrain database, other aircraft systems, or both.

8. The system of claim 1, further comprising:
    a data source for providing weather data; and
    the image generating processor
        receives the weather data corresponding to the aircraft position, such that the weather data is included as a basis for the generating of visual aid data.

9. The system of claim 8, wherein the data source for providing weather data comprises a datalink system, a manual input device, or both.

10. The system of claim 1, wherein the image generating processor is a processor of at least one of the following: a navigation system, a terrain data source, a navigation reference data source, a weather source, or a display system.

11. A module for varying the display of at least one visual aid depicted on an aircraft display unit, said module comprising:
    an input communications interface to facilitate the receiving of data from at least one data source by an image generating processor;
    the image generating processor, wherein such processor
        receives navigation data representative of aircraft position,
        receives navigation reference data representative of at least one visible feature which corresponds to the aircraft position,
        generates visual aid data representative of at least one variable-intensity visual aid, where
            each visual aid is representative of a visible feature located in the scene outside of the aircraft, and
            the intensity of each visual aid varies, where such variation is based upon at least one quality parameter of the navigation data, navigation reference data, or both, and
        provides the visual aid data to an aircraft display system, whereby the varying intensity of each visual aid depicts a fading-in effect of the visual aid in the direction of the horizon on at least one display unit; and
    an output communications interface to facilitate the providing of the visual aid data to an aircraft display system.

12. The module of claim 11, wherein the intensity of each variable-intensity visual aid is based upon a full dim position, a full bright position, or both.

13. The module of claim 12, wherein the full dim position, a full bright position, or both for each variable-intensity visual aid are configurable.

14. The module of claim 11, wherein the image generating processor
    receives terrain data corresponding to the aircraft position, such that the terrain data is included in the generating of visual aid data, whereby each visual aid is presented against the backdrop of a three-dimensional perspective of the scene outside the aircraft.

15. The module of claim 11, wherein the image generating processor
receives the weather data corresponding to the aircraft position, such that the weather data is included as a basis for the generating of visual aid data.

16. The module of claim 11, wherein the module is a module of a navigation system, a terrain data source, a navigation reference data source, a weather source, or a display system.

17. A method for varying the display of at least one visual aid depicted on an aircraft display unit, said method comprising:

receiving navigation data representative of aircraft position;

receiving navigation reference data representative of at least one visible feature which corresponds to the aircraft position;

generating visual aid data representative of at least one variable-intensity visual aid, where each visual aid is representative of a visible feature located in the scene outside of the aircraft, and the intensity of each visual aid varies, where such variation is based upon at least one quality parameter of the navigation data, navigation reference data, or both; and providing the visual aid data to an aircraft display system, whereby the varying intensity of each visual aid depicts a fading-in effect of the visual aid in the direction towards the horizon on at least one display unit.

18. The method of claim 17, wherein the intensity of each variable-intensity visual aid is based upon a full dim position, a full bright position, or both.

19. The method of claim 18, wherein the full dim position, a full bright position, or both for each variable-intensity visual aid are configurable.

20. The method of claim 17, further comprising:

receiving terrain data corresponding to the aircraft position, such the terrain data is included in the generating of visual aid data, whereby each visual aid is presented against the backdrop of a three-dimensional perspective of the scene outside the aircraft.

21. The method of claim 17, further comprising:

receiving weather data corresponding to the aircraft position, such that the weather data is included as a basis for the generating of visual aid data.

\* \* \* \* \*